Dec. 4, 1934.     C. CHRISTOFFERSON     1,982,639
AIR FILTER
Filed June 14, 1933     2 Sheets-Sheet 1
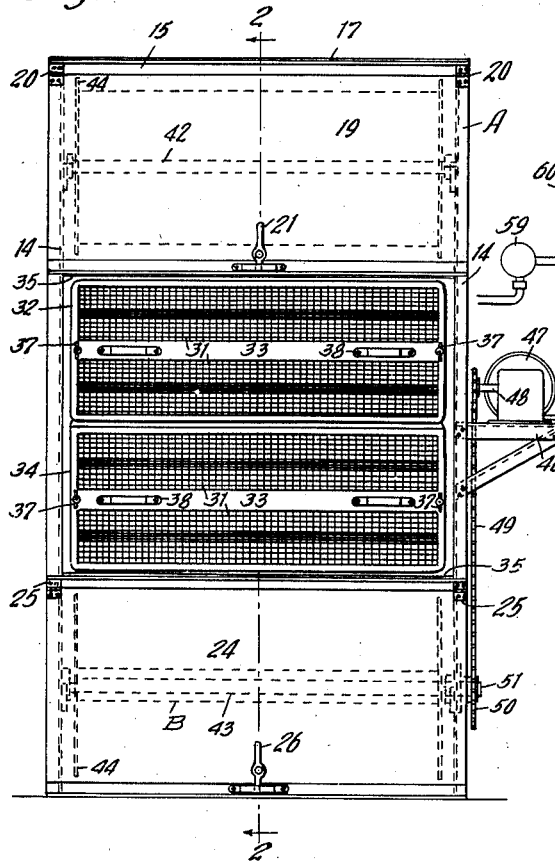
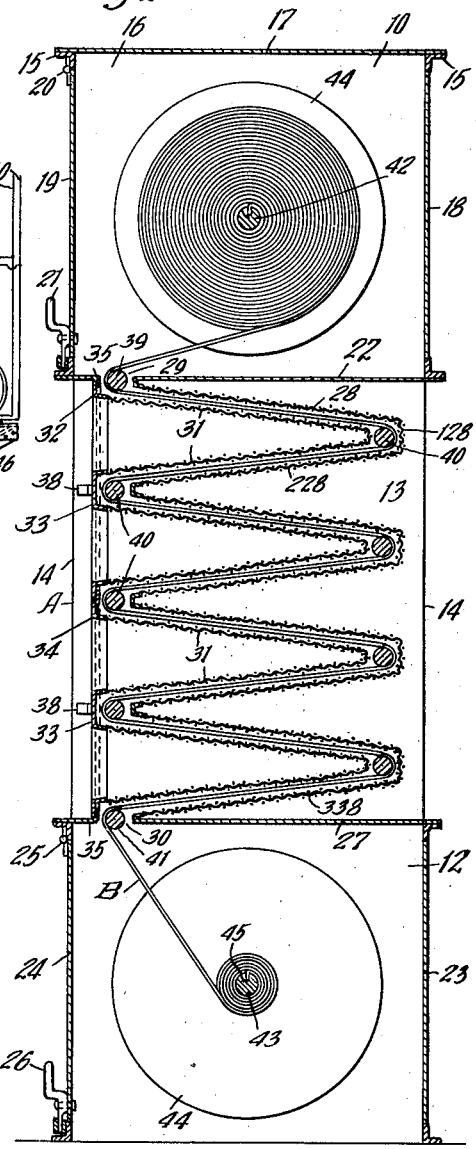
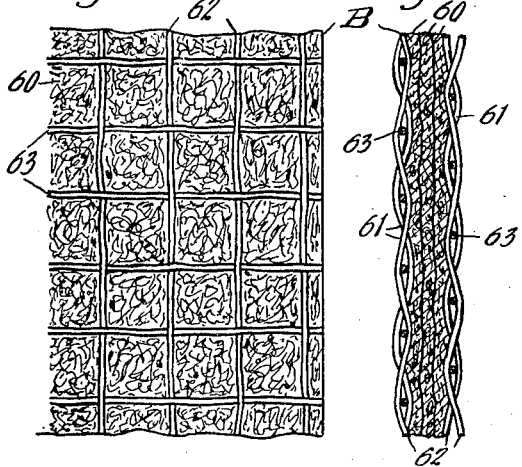
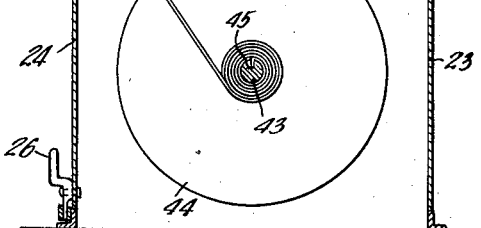
Inventor
Charles Christofferson
By Joseph Harris
His Atty.

Dec. 4, 1934.    C. CHRISTOFFERSON    1,982,639
AIR FILTER
Filed June 14, 1933    2 Sheets-Sheet 2
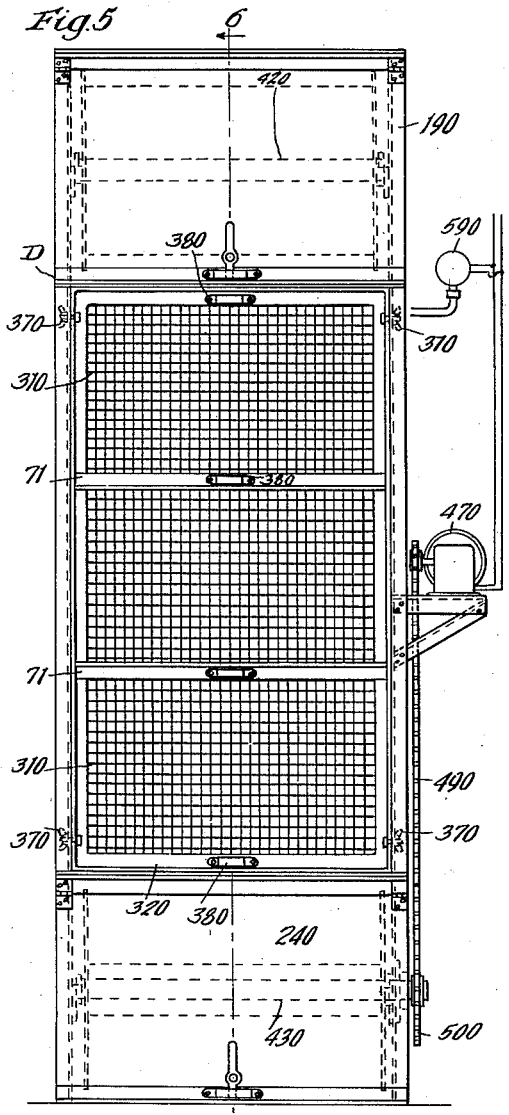
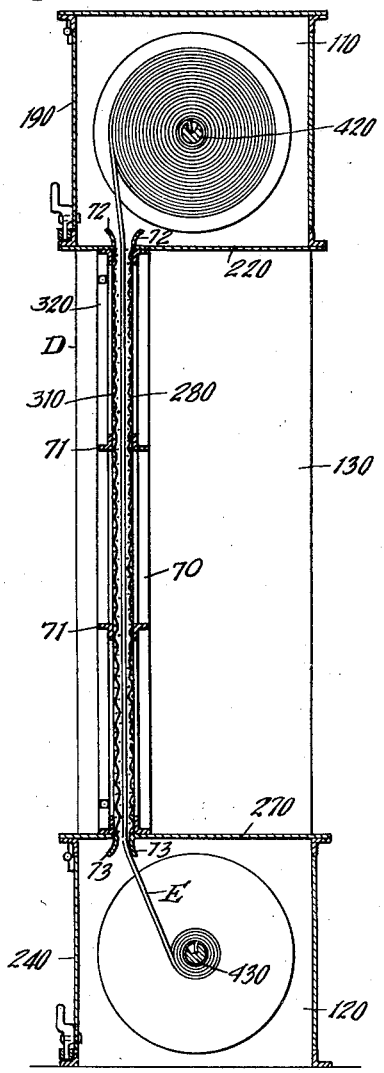
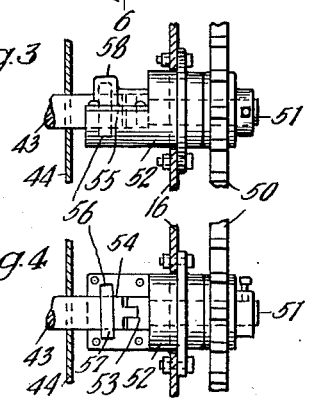
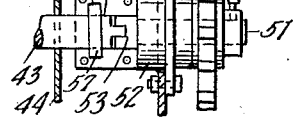
Inventor
Charles Christofferson
By Joseph Harris
His Atty.

Patented Dec. 4, 1934

1,982,639

UNITED STATES PATENT OFFICE 1,982,639

AIR FILTER

Charles Christofferson, Duluth, Minn., assignor to Universal Air Filter Corporation, Duluth Minn., a corporation of Minnesota Application June 14, 1933, Serial No. 675,685

6 Claims. (Cl. 183—62)

This invention relates to improvements in air filter.

One object of the invention is to provide a compact, simple and efficient air filtering apparatus so arranged as to insure thorough and complete removal of all impurities from the air passed therethrough, the apparatus being more particularly but not exclusively intended for large capacity installations and so arranged and operated that the resistance to the flow through the filter medium is kept at a minimum with consequent reduced power costs of operation.

Another object of the invention is to provide an air filtering apparatus wherein is provided, for a given size piece of apparatus, exceptionally large exposed filtering area of the filter medium, the latter being so arranged as to insure a uniform and low resistance throughout the entire working area, whereby not only to facilitate the passage of air therethrough in large volume but also to eliminate possibility of whistling noises or other acoustic disadvantages heretofore incident to prior arrangements.

A still further object of the invention is to provide an air filter apparatus such that the same may be automatically operated to remove or withdraw the filter medium when the same becomes too saturated or clogged with foreign matter and to replace the same with a new quantity or section of filter medium to thereby maintain the efficiency of the apparatus at all times.

A more specific object of the invention is to provide a novel air filter medium of exceptionally low resistance to the passage of air therethrough while at the same time having maximum efficiency in removing impurities, the filter medium being also especially adapted for an automatic apparatus wherein the filter medium is fed from time to time to present new areas to replace old used areas, the filter medium for this apparatus being so designed as to withstand the pulling forces applied thereto incident to the feed of the medium through the apparatus.

Still another specific object of the invention is to provide a filter medium of the character indicated in the preceding paragraph, which is efficient in the filtering of either dry or damp air and of such low resistance to the passage of air that the same may be employed in gravity air ventilating systems.

Still other objects of the invention are to provide an air filtering apparatus which will require the minimum of attention; which is so arranged that a supply of filter medium may be used therein sufficient to last for long periods of time without replacement; and which is so arranged that the feed or advancement of the filter medium may be effected automatically in accordance with changes in static pressure resulting from the depositing and collecting of foreign matter in the filter medium.

Other objects of the invention will more clearly appear from the description and claims hereinafter following.

In the drawings forming a part of this application, Figure 1 is a front elevational view of one form of apparatus embodying the improvements. Figure 2 is a vertical sectional view corresponding to the line 2—2 of Figure 1 and upon an enlarged scale. Figures 3 and 4 are detail views illustrating the manner of detachably mounting the rolls carrying the filter medium. Figures 5 and 6 are views corresponding to Figures 1 and 2 respectively, illustrating another embodiment of the invention. And Figures 7 and 8 are elevational and sectional views respectively, upon a greatly enlarged scale, of portions of the improved filter medium employed in the invention.

Referring first to the construction illustrated in Figures 1, 2, 3 and 4, the improved apparatus comprises what may be termed a main casing designated generally by the reference character A. Said casing is of generally rectangular form and comprised principally of sheet metal with suitable framing angles, said casing preferably extending vertically and divided into an upper compartment 10, a lower compartment 12 and an intermediate chamber 13, the latter being open on its front and back, as shown. The casing A preferably comprises corner uprights 14—14, top angles 15—15, vertical sheet metal side or end walls 16, top sheet metal wall 17, sheet metal back wall 18 for the upper compartment 10; a sheet metal front wall 19 for said compartment, said front wall being hinged along its upper edge as indicated at 20 and adapted to be locked in closed position by a suitable latch 21; a horizontal sheet metal partition 22 forming the bottom of the compartment 10; a rear sheet metal wall 23 for the bottom compartment 12; a front sheet metal wall 24 for the compartment 12, said wall 24 being in the form of a cover or closure hinged along its upper edge as indicated at 25 and adapted to be retained in closed position by a suitable latch 26; and a horizontal sheet metal partition 27, constituting the upper wall of the bottom compartment 12. By use of the front pivoted doors 19 to 24, it is obvious that ready access may be obtained to the upper and lower compartments 10 and 12, respectively.

The intermediate compartment 13 through which the air is circulated, has provided therein a zigzag passage or guideway for the filter medium. Said guideway is constituted preferably by moderately heavy metal screening or other reticulated material, one wall of the guideway being fixed or permanently associated with the casing, said wall being indicated at 28 and extending from an opening 29 in the bottom of the compartment 10, first downwardly and toward the right on a moderate incline, thence for a short distance vertically as indicated at 128, thence forwardly on a moderate incline, as indicated at 228, and so on back and forth until finally terminating in the inclined section 338, which leads to an opening 30 in the top wall of the compartment 12. The other wall of said zigzag guideway is formed of similar material but is preferably made removable in sections. Said other or front wall is indicated at 31 and is arranged parallel in slightly spaced relation to the other reticulated wall 28-228-338. As shown, the reticulated front wall 31 is removable in two sections by being secured to a rectangular angle frame 32, having a central cross channel 33. Similarly, the lower half of the front recticulated wall of the zigzag guideway is removable in conjunction with the lower rectangular similar frame 34. Each of the frames 32 and 34, being flanged around its periphery, seats and seals against correspondingly flanged sections 35 of the casing, each said frame being held in operative position by any suitable means such as the wing nuts 37—37 and each said frame having suitable handles 38—38 by which it may be easily manipulated. With the construction shown, it will be seen that each frame 32 carries two V-like or basket-like sections or portions of the reticulated wall 31 that may be readily entered and removed from the front side of the apparatus so as to obtain access to the filter medium, which is conducted through the zigzag passage between the spaced parallel sets of zigzag walls 28 and 31 and which together define a passageway having communication both with the upper compartment 10 and lower compartment 12.

At each of the angles or apices of the zigzag guideway, is located a relatively small diameter roller the first of such rollers being referenced 39, the intermediate rollers 40 and the last roller 41, said rollers 39 and 41 being located in the openings from and to the compartments 10 and 12, respectively, as shown. Each of said rollers will be preferably mounted in anti-friction bearings so as to reduce the friction to a minimum.

The improved air filter medium is indicated generally by the reference character B, the same being made in suitable lengths and initially wound on an upper supply roller 42 detachably mounted in suitable bearings, as hereinafter more specifically described with reference to the lower or takeup roller 43. Each roller or large spool will preferably consist of a central shaft and end discs 44—44, constituting guides for the filter medium and affording protection therefor during shipment and handling. The initial roll or supply of the filter medium is placed in the upper compartment 10 and the filter medium then threaded over the first roller 39 and thence over the intermediate rollers 40 and finally over the bottom roller 41 into the lower compartment 12, this operation being done when the front walls of the zigzag guideway are removed, as will be understood. The advance end of the filter medium is then secured to the shaft of the lower roller 43 which may be done in any suitable manner as, for instance, by slotting the shaft, folding an edge of the filter medium thereinto and clamping the same by a wood wedge 45. To feed or advance the filter medium, the following arrangement is preferably employed. Mounted on one side of the casing A on a suitable bracket 46, is a small motor 47 which operates a shaft 48 carrying a sprocket gear over which takes a sprocket chain 49, the latter running to a lower sprocket wheel 50 on a short stub shaft 51. The latter is mounted in a suitable bearing 52 (see Figures 3 and 4) carried by the side wall of the casing A and, at its inner end, is provided with a T-slot 53 with which cooperates the corresponding T end 54 of the roller shaft. The bearing 52 is half cut away as indicated at 55 and provided with a semi-annular groove 56 in which runs a corresponding annular collar 57 on the spool shaft whereby to prevent endwise play, a pivoted bearing section 58 being employed to retain the parts in operative relation when the coupling of the stub shaft and spool shaft has been completed. As will be clear from inspection of Figures 3 and 4, by opening up the pivoted cap 58, the spool with its shaft may be dropped into the bearing and coupled with the drive shaft and also readily removed. In this connection, it will be understood that, when all of the filter medium has been unwound from the upper or supply roll and accumulated or wound on the lower roll or spool, the latter is removed and the filter medium preferably burned or otherwise destroyed. The then upper empty roller will be transferred to the lower compartment and a new roll inserted in the upper compartment and the filter medium threaded through the guideway and attached to the lower empty roll as before.

To control the operation of the drive motor 47, a static resistance air gauge is preferably employed, the same being indicated conventionally at 59 and having an air pressure responsive element extended within the zigzag guideway on the front side of the air filter medium, as will be understood. Said air gauge is then connected electrically as indicated conventionally by the wiring 60 with the motor 47 so that, when the static air resistance on the front side of the filter medium reaches a certain predetermined amount, the electric circuit is closed, the motor 47 operated, and the air filter medium advanced or fed so as to remove the used portion or area thereof from within the guideway and replacing the used portion by a new or clean portion. In this connection, as will be understood by those skilled in the art, after the filter medium has been in use for a certain length of time, the accumulations of dirt, dust and other foreign matter thereon, will gradually build up the resistance to passage of the air. Immediately upon supplying a new portion of the filter medium, the resistance will drop back to normal, whereupon the static pressure will drop and the motor stop. While an automatic intermittent feed of the filter medium governed by the static air resistance is preferred as just described, nevertheless it will be obvious to those skilled in the art that various other means may be employed for effecting the feed of the filter medium such as a hand feed or a time controlled feed operative at intervals of certain number of hours or days, as may be desired.

As apparent from the preceding description taken in connection with the drawings, the arrangement described provides an unusually large active area of the filter medium for filtering the air passing therethrough. To insure efficient operation with minimum power consumption, it is also highly essential that the filter medium be of such character as to present minimum resistance to the air passing therethrough, while insuring retention of all foreign matter. Likewise, for the successful operation of the apparatus shown herein, where the filter medium is necessarily advanced from time to time under tension, suitable means must be incorporated in the filter medium to withstand the tension to which it is subject. To attain all of these ends, a special filter medium is employed, the details of which are best illustrated in Figures 7 and 8. Preferably, the filter medium comprises a plurality of central or intermediate layers of very finely carded cotton fiber, three of such layers being indicated at 60—60 in Figure 8, although a greater or lesser number of layers may be employed. These layers constitute the filter medium proper and necessarily the fibers are loosely arranged so as to be devoid of any substantial tensile strength and per se, would be incapable of being advanced under tension through the apparatus. However, by employing a plurality of layers even though the fibers are very loosely felted, foreign matter will be readily caught in some one or more of said layers in the passage of the air therethrough. To provide the filter medium with the necessary tensile strength lengthwise thereof and also to properly retain the intermediate layers 60 in their proper assembled relation, outer layers indicated at 61—61 are employed of special construction. Each of said outer layers 61 is of relatively large open mesh or net work consisting of longitudinally extending or warp threads 62—62 of linen and transverse or woof threads 63—63 of silk rayon. Said outer layers, linings or retainers 61 may, if desired, be also stitched to and through the other intermediate cotton fiber layers. Said outer layers 61, as will be apparent, provide the necessary tensile and retaining strength for the entire filter medium to allow of the winding up of the medium in rolls and withstand the tension incident to threading and feeding through the apparatus from the one roll to the other, the linen warp threads affording a tensile strength of as high as two hundred pounds and, while affording this strength, do not militate against free and easy passage of the air through the medium, considered as an entirety. It will further be observed that with the preferred materials constituting the filter medium B, the same is equally effective with either dry or moist air as distinguished from filter mediums utilizing paper or pulp and, also, the filter medium may be manufactured at such small expense that when saturated with dirt or other foreign matter, the same can be destroyed without economic waste.

It is also contemplated that the filter medium be chemically treated with suitable germicides or other chemicals either by dipping the medium therein or by spraying the chemicals onto the medium. The chemical treatment will vary in accordance with the location and use of the apparatus. In hospitals, public buildings and the like, the chemical treatment will generally or preferably be such as to destroy bacteria and the like that may be present in the air. In other localities and installations, the chemical treatment may be such as to counteract undesirable odors or gases that may be present in the air being filtered or to impart some desirable pleasant odor.

Referring next to the construction illustrated in Figures 5 and 6, the casing D is of generally similar form to the casing A, having an upper compartment 110, a lower compartment 120 and a central or intermediate filtering chamber 130. The upper compartment is provided with a front hinged door 190 and the lower compartment with a similar hinged door 240 as in the first described construction and the intermediate partitions or walls separating the compartments from the intermediate chamber are indicated at 220 and 270, respectively. The upper supply roll is indicated at 420 and the lower takeup roll at 430 and the air filter medium by the reference character E.

In this construction, a straight vertical guideway is provided for the filter medium, the same being defined and constituted by front and rear spaced reticulated walls 310 and 280, respectively. The latter is also preferably in the form of screening suitably secured to an angular frame 70 permanently maintained in place. The front wall 310, also in the form of screening, is secured to an angle frame 320, in this instance the frame and front wall covering the full area of the inlet opening to the chamber 130. Said frame 320 is provided with suitable transverse angular braces 71—71 and handles 380 and is adapted to be removably retained in position by suitable means such as the wing nuts 370.

The lower or takeup roll is adapted to be operated in the same manner as that of the first described form through a motor 470, sprocket chain 490 and lower sprocket wheel 500, it being understood that the rolls carrying the filter medium are removable and interchangeable in the same manner as previously described. Likewise, the motor 470 is preferably governed by a similar static resistance air gauge 590 and in the manner previously described. Preferably also, the upper compartment 110 is provided with flared guides 72—72 for the opening through which the filter medium passes into the vertical guideway and corresponding guides 73—73 are utilized at the bottom opening communicating with the compartment 120.

In the drawings illustrating the two forms of the apparatus, only a single unit has been indicated. As will be understood by those skilled in the art, each unit may be made in different sizes and a plurality of units may be employed in a battery dependent upon the total capacity desired and nature of the installation. Generally speaking, the type illustrated in Figures 1 and 2 will be used in very large buildings such as all types of public buildings, factories, hospitals and the like, whereas the form shown in Figures 5 and 6 will preferably be used in somewhat smaller installations.

Further, the units will preferably be so made that large rolls of the filter medium may be employed and/preferably such a quantity that a single roll will last for approximately a year, when operated in the manner hereinbefore described. The life of the filter medium can also be extended considerably by cleaning the same periodically with a vacuum cleaner, this being done by running the vacuum cleaner over the front walls of the guideways, care being taken not to apply too great a suction pressure that might disrupt the filter medium or unduly pull the same into the interstices of the screens.

From the preceding description considered in connection with the drawings, it will be seen that in both forms of the apparatus, an unusually large working area of the filter medium is made available for a unit of given size, thus rendering the apparatus compact and adapting the apparatus for substantially universal installation. On account of the low and uniform resistance to passage of air because of the particular filter medium employed and large areas exposed, operating and maintenance costs are reduced to a minimum and all undesirable noises are avoided. By employing the preferred automatic operation described, practically no attention is necessary, thus reducing the cost of supervision, and by employing chemically treated or medicated media, all bacteria as well as other foreign matter may readily be removed or the air suitably impregnated with desirable odors or odors for neutralizing undesirable odors present in the atmosphere.

Although the preferred manner of carrying out the invention has herein been shown and described, the same is by way of illustration and not by way of limitation, all changes and modifications being contemplated that come within the scope of the claims appended hereto.

What is claimed is:

1. In an air filtering apparatus, the combination with a casing having end compartments and an intermediate chamber for the passage of air therethrough; of a zigzag guideway in said chamber communicating at its ends with said compartments, said guideway being defined and constituted by spaced zigzag front and back reticulated walls one of said walls being displaceable to provide access to a filter medium within the guideway; guiding and deflecting members within said guideway at the end of each traverse thereof; supply and takeup rolls in the end compartments; and an air filter medium extending from the supply roll through the guideway and back and forth over said members therein and to the takeup roll, said members retaining the filter medium in the zigzag formation when said displacement wall is moved from operative position to provide access to the filter medium.

2. In an air filtering apparatus, the combination with a casing having end compartments and an intermediate chamber for the passage of air therethrough; of a zigzag guideway in said chamber communicating at its ends with said compartments, said guideway being defined and constituted by spaced zigzag front and back reticulated walls, said front wall being in sections and each section carried by a removable frame; an air filter medium extended through said guideway; and means for feeding the filter medium through the guideway.

3. In an air filtering apparatus, the combination with a casing having an upper compartment provided with an access door, an intermediate filtering chamber, and a lower compartment having also an access door; of a fixed section of screening disposed in said chamber and extending in a zigzag course from the upper compartment to the lower compartment; of a removable section of screening likewise disposed in said chamber and extending in a similar zigzag path in spaced relation to the fixed screening and forming therewith a guideway; rollers in said guideway at the ends and each angle thereof; a supply roller in one of said compartments; a takeup roller in the other compartment; a length of air filter medium extending from one roller to the other roller through said guideway and around the rollers therein; and automatically controlled and governed means for periodicaly effecting rotation of the takeup roll to advance the filter medium through the guideway.

4. In an air filtering apparatus, the combination with a casing having end compartments and an intermediate chamber open both front and back for the passage of air therethrough, said end compartments being separated from the chamber by partitions; of a guideway in said chamber communicating at its ends with said compartments through openings in said partitions, said guideway being defined and constituted by front and back screen sections, one of said sections being displaceable and the other permanently fixed; an air filter medium extending through said guideway; and means for advancing the filter medium through the guideway.

5. In an air filtering apparatus, the combination with a casing having a chamber for the passage of air therethrough; of a guideway in said chamber of generally zigzag form, said guideway being defined and constituted by spaced zigzag front and back reticulated walls, portions of one of said walls being displaceable to provide access to a filter medium within the guideway; guiding and deflecting members, independent of said walls defining the guideway, within said guideway at the end of each traverse thereof and at the entrance and exit openings thereof; and a length of air filter medium extending through said guideway and directly supported by said members by being extended back and forth thereover, said members supporting the filter medium also when said wall portions are displaced.

6. In an air filtering apparatus, the combination with a casing having closed end compartments and an intermediate chamber, the intermediate chamber being separated from the end compartments by partitions, each end compartment having an access door and the intermediate chamber being open both front and back for the passage of air therethrough; of a guideway in said chamber communicating at its ends through openings in said partitions with said end compartments, said guideway being defined and constituted by spaced front and back reticulated walls, portions of one of said walls being detachably removable to thereby provide access to the guideway; a supply roller in one of said end compartments; a takeup roller in the other of said end compartments; and a length of air filter medium extending from the supply roller to and through the guideway and to the takeup roller.

CHARLES CHRISTOFFERSON.